(12) United States Patent
Jung

(10) Patent No.: US 11,273,817 B2
(45) Date of Patent: Mar. 15, 2022

(54) ELECTRIC BOOSTER

(71) Applicant: HYUNDAI MOBIS CO., LTD., Seoul (KR)

(72) Inventor: Ha Min Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/921,041

(22) Filed: Jul. 6, 2020

(65) Prior Publication Data

US 2021/0016757 A1 Jan. 21, 2021

(30) Foreign Application Priority Data

Jul. 16, 2019 (KR) .......................... 10-2019-0085699

(51) Int. Cl.
*B60T 13/74* (2006.01)
(52) U.S. Cl.
CPC .................................. *B60T 13/745* (2013.01)
(58) Field of Classification Search
CPC ............................... B60T 13/745; B60T 13/74
See application file for complete search history.

(56) References Cited

U.S. PATENT DOCUMENTS

| 2019/0023249 A1* | 1/2019 | Gaffe ......................... B60T 7/12 |
| 2019/0063529 A1* | 2/2019 | Eguchi ..................... F16J 15/32 |
| 2020/0023828 A1* | 1/2020 | Fukayama ............ B60T 13/148 |

FOREIGN PATENT DOCUMENTS

| KR | 10-2012-0045597 A | 5/2012 | |
| WO | WO-2018155286 A1 * | 8/2018 | .............. B60T 7/042 |

* cited by examiner

*Primary Examiner* — Michael Leslie
*Assistant Examiner* — Daniel S Collins
(74) *Attorney, Agent, or Firm* — Morgan, Lewis & Bockius LLP

(57) ABSTRACT

An electric booster may include: a driving part; a gear part rotated by the driving part so as to transfer power; a rotating nut part rotated by the gear part; a moving bolt part screwed to the rotating nut part, and linearly reciprocated by the rotation of the rotating nut part; a pedal pressing part disposed through the moving bolt part, and configured to transfer a pedal force; a load part moved by the moving bolt part and the pedal pressing part, and configured to amplify hydraulic pressure; a disk part formed in the load part, and configured to relieve shock of the moving bolt part and the pedal pressing part; and a housing part mounted on the driving part, configured to house the gear part, the rotating nut part, the moving bolt part and the pedal pressing part therein, and constituted by a pair of housing parts.

7 Claims, 8 Drawing Sheets

1

ELECTRIC BOOSTER

CROSS-REFERENCE TO RELATED APPLICATION

This application claims priority from and the benefit of Korean Patent Application No. 10-2019-0085699, filed on Jul. 16, 2019, which is hereby incorporated by reference for all purposes as if set forth herein.

BACKGROUND

Field

Exemplary embodiments of the present disclosure relate to an electric booster, and more particularly, to an electric booster which can shorten the assembling time by improving assembling performance, and prevent introduction of moisture.

Discussion of the Background

In general, an electric booster drives a motor to pressurize a master cylinder, and the master cylinder generates braking pressure. Such an electric booster includes a motor, a rotating nut rotated by the motor, a moving bolt linearly reciprocated by the rotating nut, and a piston which generates braking pressure while moved by the moving bolt. At this time, a part of a pedal force generated by a driver is transferred through the moving bolt and presses the piston, and the piston includes a disk for uniformly providing a pedal force and a motor force.

The motor, the rotating nut, the moving bolt and the piston are housed in a housing, and the housing is implemented as a pair of upper and lower housings coupled through bolts.

However, the conventional electric booster requires an additional space for coupling the housings through bolts, and thus has a disadvantage in system layout. In order to individually fasten the plurality of bolts, the assembling time is increased. Therefore, there is a need for a device capable of solving the problem.

The related art of the present disclosure is disclosed in Korean Patent Application No. 2012-0045597 published on May 9, 2012 and entitled "Electronic Booster-Type Brake Device".

SUMMARY

Various embodiments are directed to an electric booster which can shorten the assembling time by improving assembling performance, and prevent introduction of moisture.

In an embodiment, an electric booster may include: a driving part; a gear part rotated by the driving part so as to transfer power; a rotating nut part rotated by the gear part; a moving bolt part screwed to the rotating nut part, and linearly reciprocated by the rotation of the rotating nut part; a pedal pressing part disposed through the moving bolt part, and configured to transfer a pedal force; a load part moved by the moving bolt part and the pedal pressing part, and configured to amplify hydraulic pressure of a cylinder part; a disk part formed in the load part, and configured to relieve shock of the moving bolt part and the pedal pressing part; and a housing part mounted on the driving part, configured to house the gear part, the rotating nut part, the moving bolt part and the pedal pressing part therein, and constituted by a pair of housing parts to which any one or more of bolt coupling and hook coupling is applied.

The housing part may include: a first housing part coupled to the driving part, and having one open side through which the gear part, the rotating nut part, the moving bolt part and the pedal pressing part are housed in the first housing part; a second housing part configured to cover the open side of the first housing part; a sealing part disposed between the first and second housing parts; a bolt coupling part configured to bolt-couple the first and second housing parts to each other; and a hook coupling part configured to hook-couple the first and second housing parts to each other.

The bolt coupling part may couple the first and second housing parts which cover the moving bolt part.

The first housing part may include: a first housing body part having one open side; a first housing insertion part formed at an end of the first housing body part, such that the sealing part is inserted into the first housing insertion part; and a first housing coupling part protruding to the outside of the first housing body part, and configured to induce coupling with the bolt coupling part.

The second housing part may include: a second housing body part configured to cover the open side of the first housing body part, and press the sealing part; and a second housing coupling part protruding to the outside of the second housing body part, and configured to induce coupling with the bolt coupling part.

The hook coupling part may couple the first and second housing parts which cover the gear part.

The hook coupling part may include: a first hook extension part extended from the second housing part so as to cover the first housing part, and having elasticity; a first hook protrusion part formed at an end of the first hook extension part, and protruding to the inside of the first housing part; and a first hook locking part formed in the first housing part, such that the first hook protrusion part is inserted and locked to the first hook locking part.

The first hook protrusion part may have a first inclined surface formed thereon, and the first hook locking part may have a first locking step corresponding to the first inclined surface.

The hook coupling part may include: a second hook rod part disposed outside the first and second housing parts, and having elasticity; a second hook protrusion part formed at either end of the second hook rod part, and protruding to the inside of each of the first and second housing parts; and a second hook locking part formed in each of the first and second housing parts, such that the second hook protrusion part is inserted and locked to the second hook locking part.

The second hook protrusion part may have a second inclined surface formed thereon, and the second hook locking part may have a second locking step corresponding to the second inclined surface.

In the electric booster in accordance with the embodiment of the present disclosure, the bolt coupling and the hook coupling may be applied according to a portion which requires the support force of the housing part, which makes it possible to improve the assembling performance.

In the electric booster in accordance with the embodiment of the present disclosure, the sealing part may be disposed between the first and second housing parts so as to block introduction of moisture.

DETAILED DESCRIPTION OF THE ILLUSTRATED EMBODIMENTS

Hereinafter, an electric booster will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
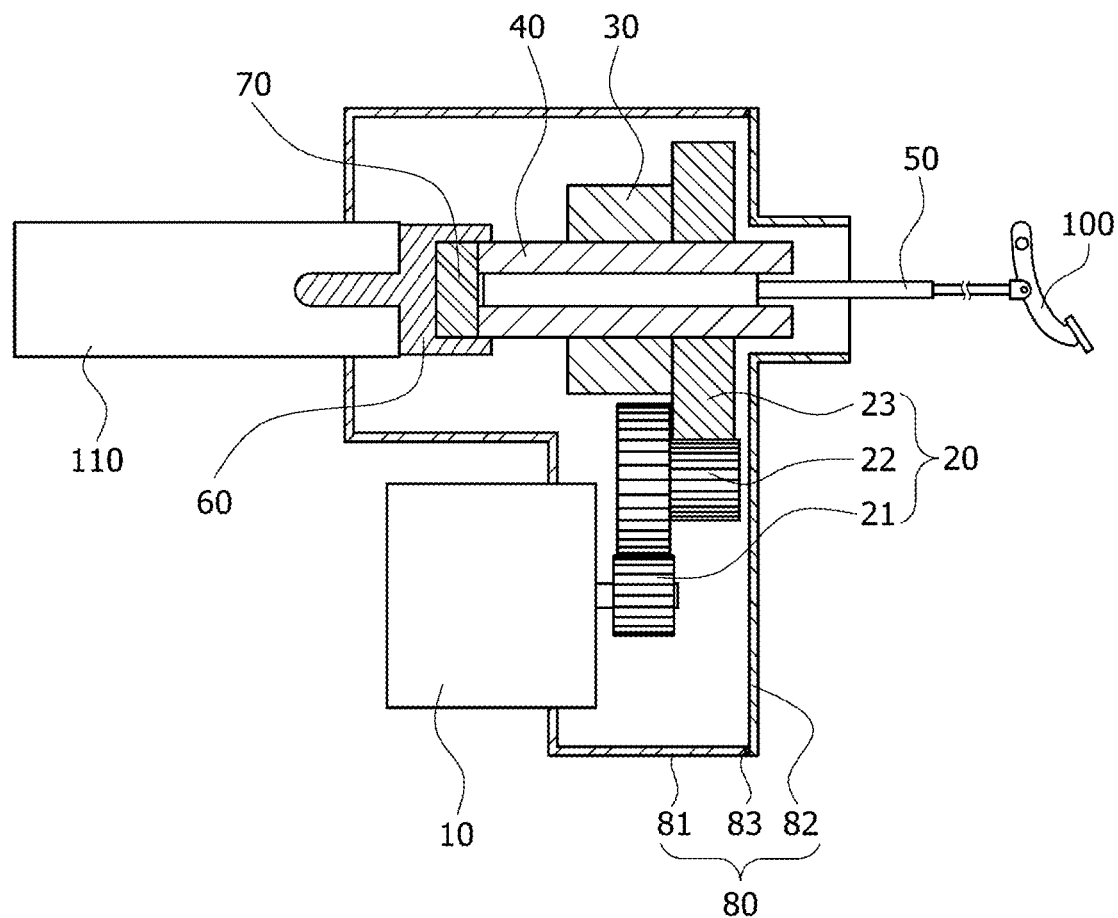
FIG. 1 is a diagram schematically illustrating an electric booster in accordance with the embodiment of the present disclosure.

FIG. 1 is a diagram schematically illustrating an electric booster in accordance with an embodiment of the present disclosure. Referring to FIG. 1, the electric booster 1 in accordance with the embodiment of the present disclosure includes a driving part 10, a gear part 20, a rotating nut part 30, a moving bolt part 40, a pedal pressing part 50, a load part 60, a disk part 70 and a housing part 80.

The driving part 10 is driven when power is applied thereto. For example, the driving part 10 may be driven by control of a controller for braking a vehicle, and a motor for providing a rotational force may be used as the driving part 10. During autonomous driving of the vehicle, the driving part 10 is operated by control of the controller. When the vehicle is driven by a driver, the driving part 10 may be operated according to whether the pedal pressing part 50 is operated.

The gear part 20 is rotated by the driving part 10, and transfers power. For example, the gear part 20 may include a first gear part 21, a second gear part 22 and a third gear part 23. The first gear part 21 is mounted on the driving part 10 and rotated, the second gear part 22 is engaged and rotated with the first gear part 21, and the third gear part 23 is engaged and rotated with the second gear part 22.

The rotating nut part 30 is rotated by the gear part 20. For example, the rotating nut part 30 may be coupled to the third gear part 23 and rotated. The rotating nut part 30 may be restricted from moving from side to side, and rotated in a forward or reverse direction according to a driving state of the driving part 10.

The moving bolt part 40 may be screwed to the rotating nut part 30, and linearly reciprocated by the rotation of the rotating nut part 30. For example, the moving bolt part 40 may have a screw thread formed on the outer circumferential surface thereof, and be screwed to the rotating nut part 30 through the rotating nut part 30.

The pedal pressing part 50 is disposed through the moving bolt part 40, and transfers a pedal force. For example, when a driver operates the pedal 100, the pedal pressing part 50 may be moved toward the load part 60.

The load part 60 is moved by the moving bolt part 40 and the pedal pressing part 50, and amplifies hydraulic pressure of a cylinder part 110. For example, when the cylinder part 110 has braking fluid stored therein and the moving bolt part 40 and the pedal pressing part 50 push the load part 60, the hydraulic pressure of the braking fluid stored in the cylinder part 110 may be adjusted while the load part 60 inserted into the cylinder part 110 is moved. The hydraulic pressure amplified by the cylinder part 110 may reach a wheel cylinder and thus provide a braking force to a wheel.

The disk part 70 is formed in the load part 60, and relieves the shock of the moving bolt part 40 and the pedal pressing part 50. For example, the disk part 70 may be formed of an elastic material such as rubber.

The housing part 80 is mounted on the driving part 10, and the gear part 20, the rotating nut part 30, the moving bolt part 40 and the pedal pressing part 50 are housed in the housing part 80. The housing part 80 may be implemented as a pair of housing parts, and any one or more of bolt coupling and hook coupling may be applied to maintain the coupling state between the pair of housing parts. For example, the bolt coupling may be applied to a portion which requires a high support force in an axial direction because a thrust force is generated, and the hook coupling may be applied to a portion which requires a low support force in the axial direction.

Figure 2:
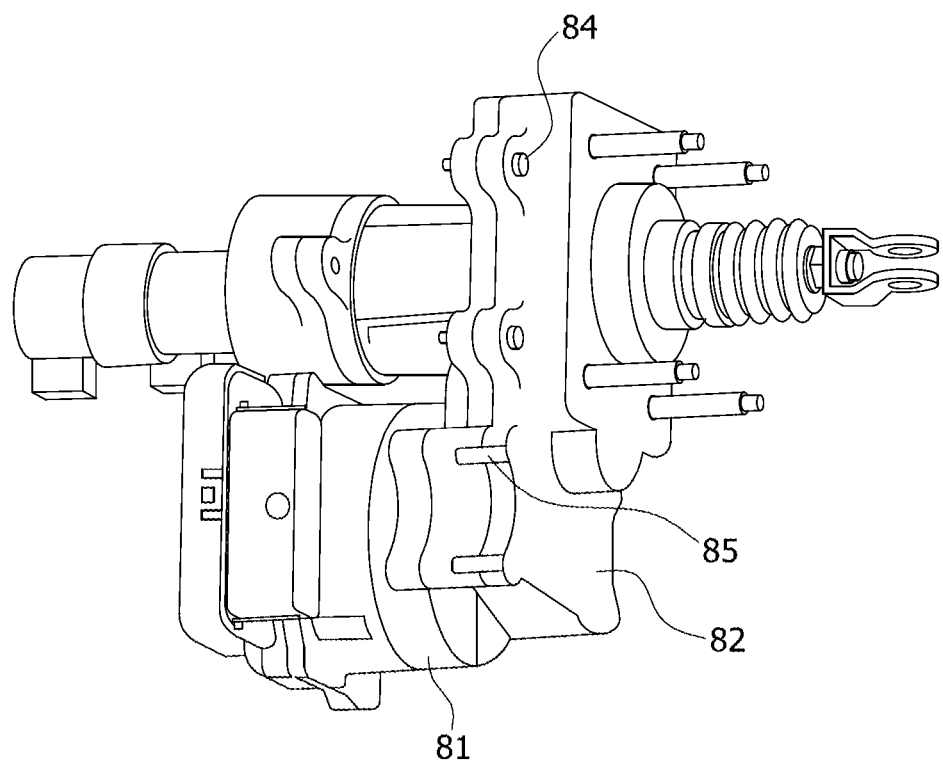
FIG. 2 is a diagram schematically illustrating a housing part in accordance with the embodiment of the present disclosure.

FIG. 2 is a diagram schematically illustrating the housing part in accordance with the embodiment of the present disclosure. Referring to FIG. 2, the housing part 80 in accordance with the embodiment of the present disclosure includes a first housing part 81, a second housing part 82, a sealing part 83, a bolt coupling part 84 and a hook coupling part 85.

The first housing part 81 is coupled to the driving part 10, and has one open side such that the gear part 20, the rotating nut part 30, the moving bolt part 40 and the pedal pressing part 50 are housed in the first housing part 81. The second housing part 82 covers the open side of the first housing part 81.

The sealing part 83 is disposed between the first and second housing parts 81 and 82. For example, the sealing part 83 may be formed of rubber. The sealing part 83 may be inserted into any one of the first and second housing parts 81 and 82, and pressed by the other so as to block introduction of moisture.

The bolt coupling part 84 bolt-couples the first and second housing parts 81 and 82 to each other. For example, the bolt coupling part 84 may include an assembling bolt and nut, and the assembling bolt passed through the first and second housing parts 81 and 82 may be screwed to the assembling nut, and couple the first and second housing parts 81 and 82.

The hook coupling part 85 hook-couples the first and second housing parts 81 and 82 to each other. For example, the hook coupling part 85 may be formed on any one of the first and second housing parts 81 and 82, and hook-coupled to the other. According to embodiment, the hook coupling part 85 may be formed on each of the first and second housing parts 81 and 82.

The bolt coupling part 84 couples the first and second housing parts 81 and 82 that cover the moving bolt part 40 which requires a high support force in the axial direction because torque is generated in the moving bolt part 40.

The hook coupling part 85 couples the first and second housing parts 81 and 82 that cover the gear part 20 which does not require a high support force in the axial direction of the driving part 10.

Figure 3:
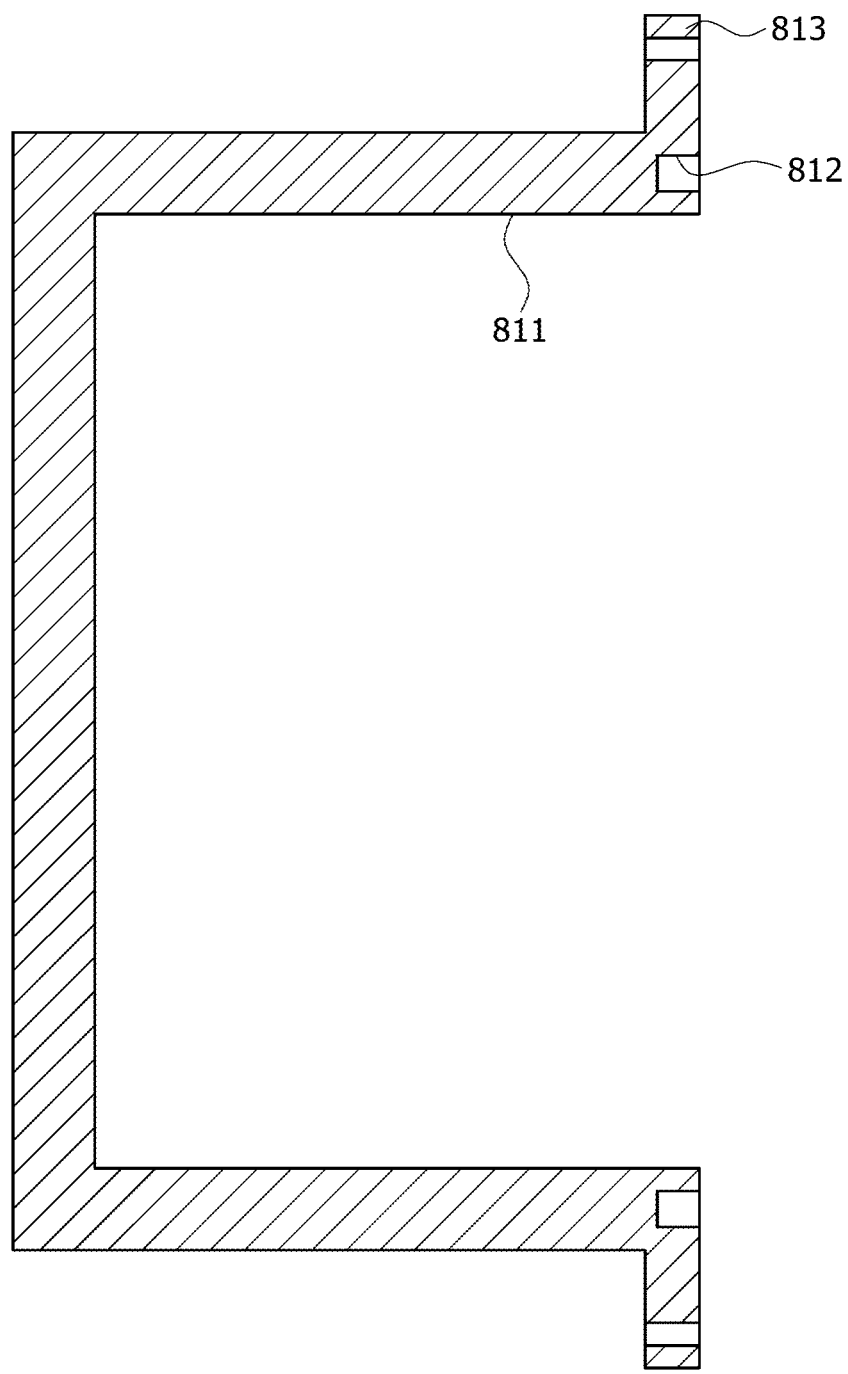
FIG. 3 is a cross-sectional view schematically illustrating a first housing part in accordance with the embodiment of the present disclosure.

FIG. 3 is a cross-sectional view schematically illustrating the first housing part in accordance with the embodiment of the present disclosure. Referring to FIG. 3, the first housing part 81 in accordance with the embodiment of the present disclosure includes a first housing body part 811, a first housing insertion part 812 and a first housing coupling part 813.

The first housing body part 811 has one open side. For example, the first housing body part 811 may be bolt-coupled to the driving part 10, and a part of the driving part 10 may be disposed in the first housing body part 811 through the first housing body part 811. Furthermore, the cylinder part 110 disposed on the same axis as the pedal pressing part 50 may be bolt-coupled to the first housing body part 811. A part of the cylinder part 110 may be disposed in the first housing body part 811 through the first housing body part 811. The gear part 20 connected to the driving part 10 to transfer power, the rotating nut part 30 rotated by the gear part 20, and the moving bolt part 40 which is linearly reciprocated on the same axis as the pedal pressing part 50 by the rotation of the rotating nut part 30 may be housed in the first housing body part 811.

The first housing insertion part 812 is formed at an end of the first housing body part 811, and the sealing part 83 is inserted into the first housing insertion part 812. For example, the first housing insertion part 812 may have a concave groove formed at an end thereof, such that the sealing part 83 can be inserted into the groove.

The first housing coupling part 813 protrudes to the outside of the first housing body part 811, and induces coupling with the bolt coupling part 84. For example, the plurality of first housing coupling parts 813 may protrude to the outside of the first housing body part 811 covering the moving bolt part 40.

Figure 4:
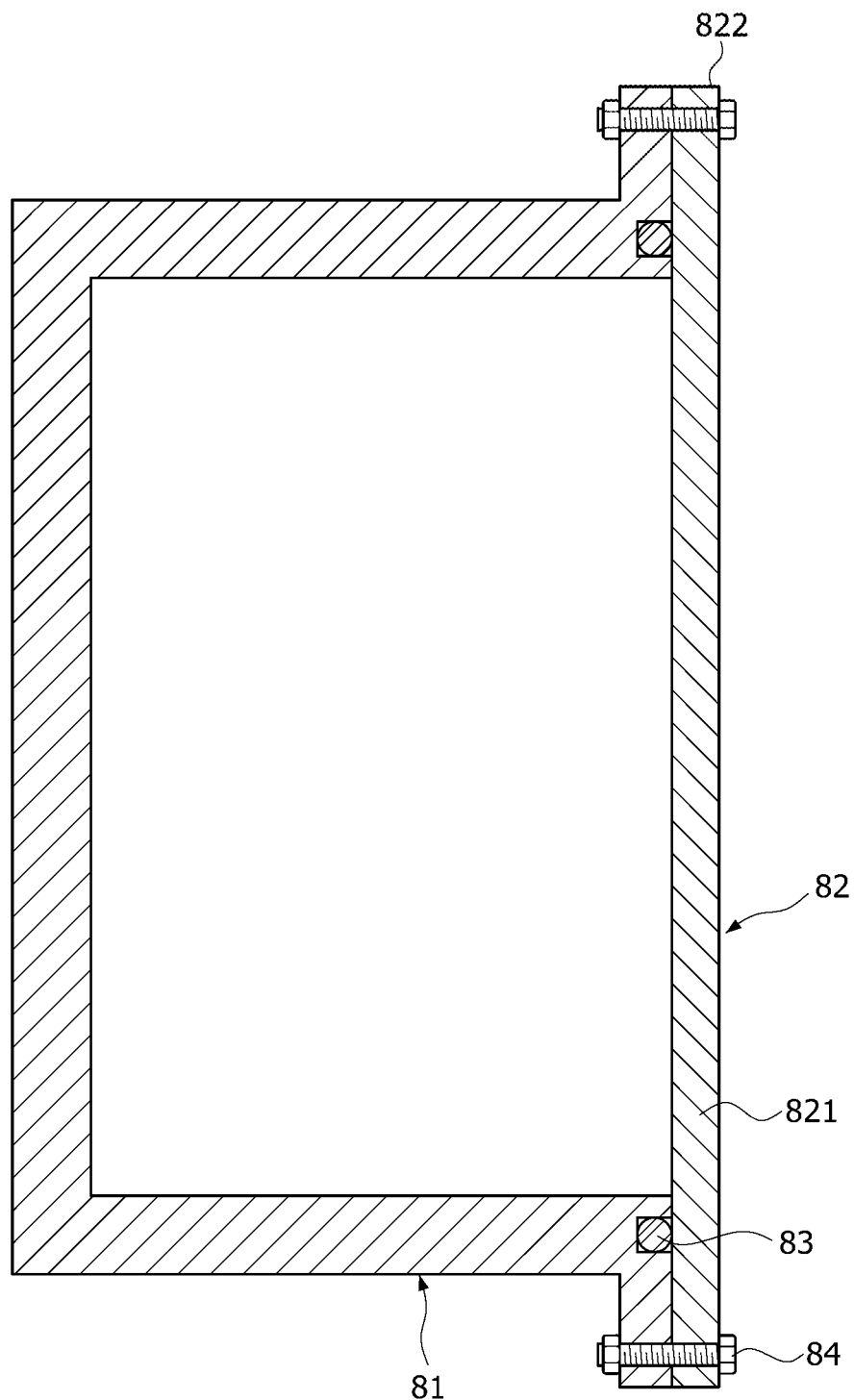
FIG. 4 is a cross-sectional view schematically illustrating a second housing part in accordance with the embodiment of the present disclosure.

FIG. 4 is a cross-sectional view schematically illustrating the second housing part in accordance with the embodiment of the present disclosure. Referring to FIG. 4, the second housing part 82 in accordance with the embodiment of the present disclosure includes a second housing body part 821 and a second housing coupling part 822.

The second housing body part 821 covers the open side of the first housing body part 811, and presses the sealing part 83 inserted into the first housing insertion part 812 while brought into surface contact with the end of the first housing body part 811.

The second housing coupling part 822 is extended to the outside of the second housing body part 821, and induces coupling with the bolt coupling part 84. For example, the second housing coupling part 822 may be disposed to face the first housing coupling part 813.

Figure 5:
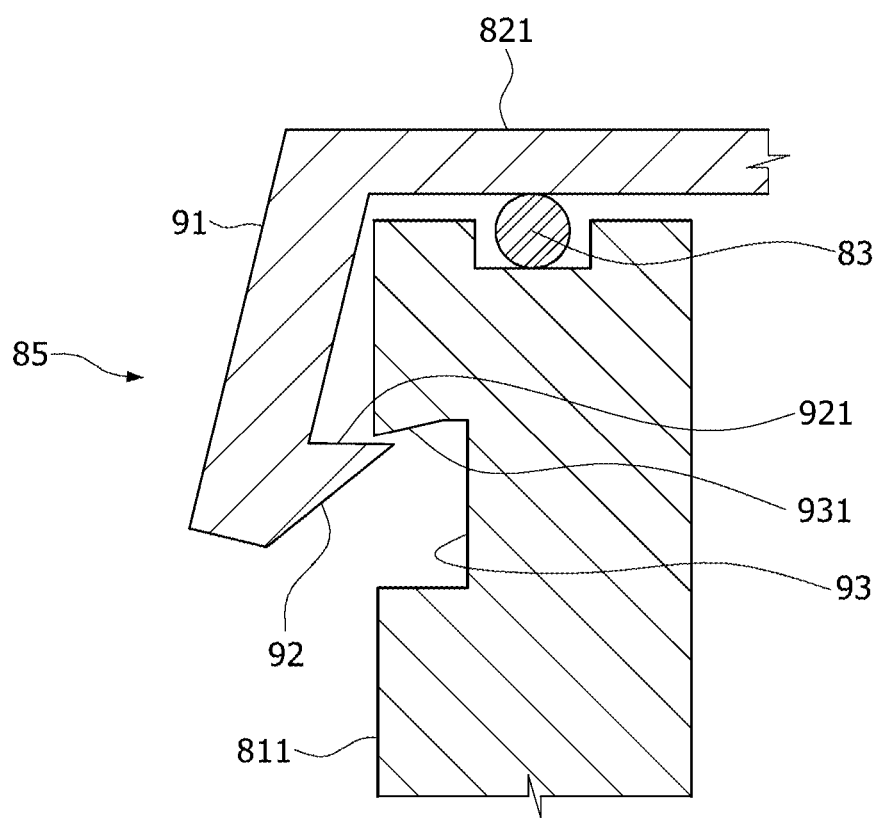
FIG. 5 is a diagram schematically illustrating a state before a hook coupling part in accordance with a first embodiment of the present disclosure is assembled.
Figure 6:
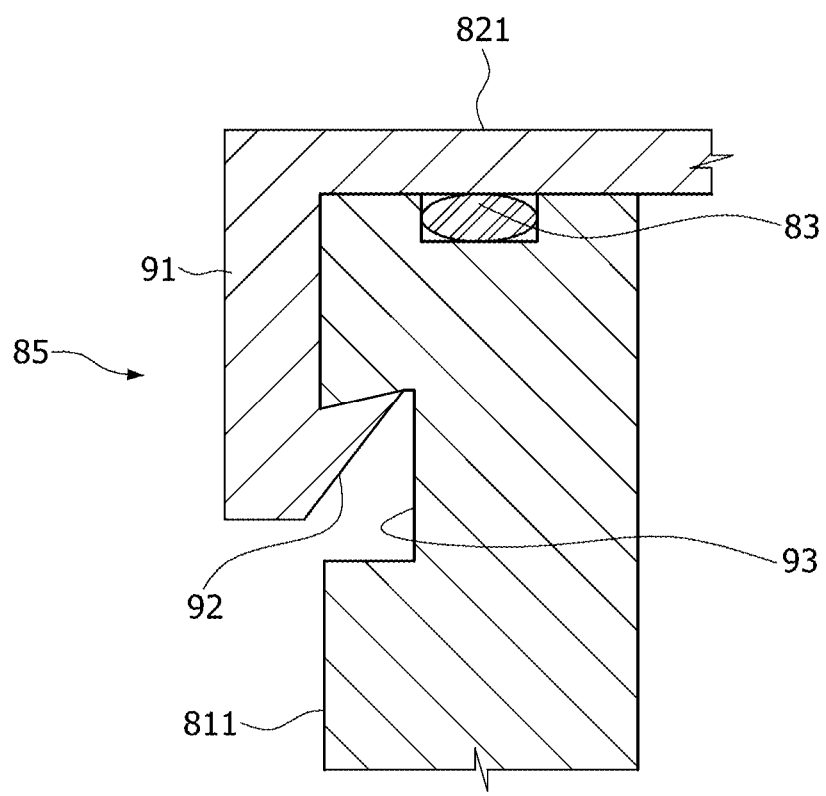
FIG. 6 is a diagram schematically illustrating a state in which the hook coupling part in accordance with the first embodiment of the present disclosure is completely assembled.

FIG. 5 is a diagram schematically illustrating a state before a hook coupling part in accordance with a first embodiment of the present disclosure is assembled, and FIG. 6 is a diagram schematically illustrating a state in which the hook coupling part in accordance with the first embodiment of the present disclosure is completely assembled. Referring to FIGS. 5 and 6, the hook coupling part 85 in accordance with the embodiment of the present disclosure includes a first hook extension part 91, a first hook protrusion part 92 and a first hook locking part 93.

The first hook extension part 91 is extended from the second housing part 82 so as to cover the first housing part 81, and has elasticity. For example, the plurality of first hook extension parts 91 may be formed in a rod shape, extended from the second housing body part 821 covering the gear part 20, and disposed outside the first housing body part 811.

The first hook protrusion part 92 is formed at an end of the first hook extension part 91, and protrudes to the inside of the first housing part 81. For example, the first hook protrusion part 92 may have a cross-section formed in a triangle shape, and have a vertex facing the inside of the first housing part 81.

The first hook locking part 93 is formed in the first housing part 81, and the first hook protrusion part 92 is inserted and locked to the first hook locking part 93. For example, the first hook locking part 93 may be formed in a recessed groove shape outside the first housing body part 811. When the second housing body part 821 presses the sealing part 83, the first hook protrusion part 92 may be inserted and locked to the first hook locking part 93.

At this time, the first hook protrusion part 92 has a first inclined surface 921, and the first hook locking part 93 has a first locking step 931 corresponding to the first inclined surface 921. For example, when the first hook protrusion part 92 has a cross-section formed in an obtuse triangle shape, the first hook protrusion part 92 may be prevented from being released from the hook coupling, after being locked and fixed to the first hook locking part 93.

Figure 7:
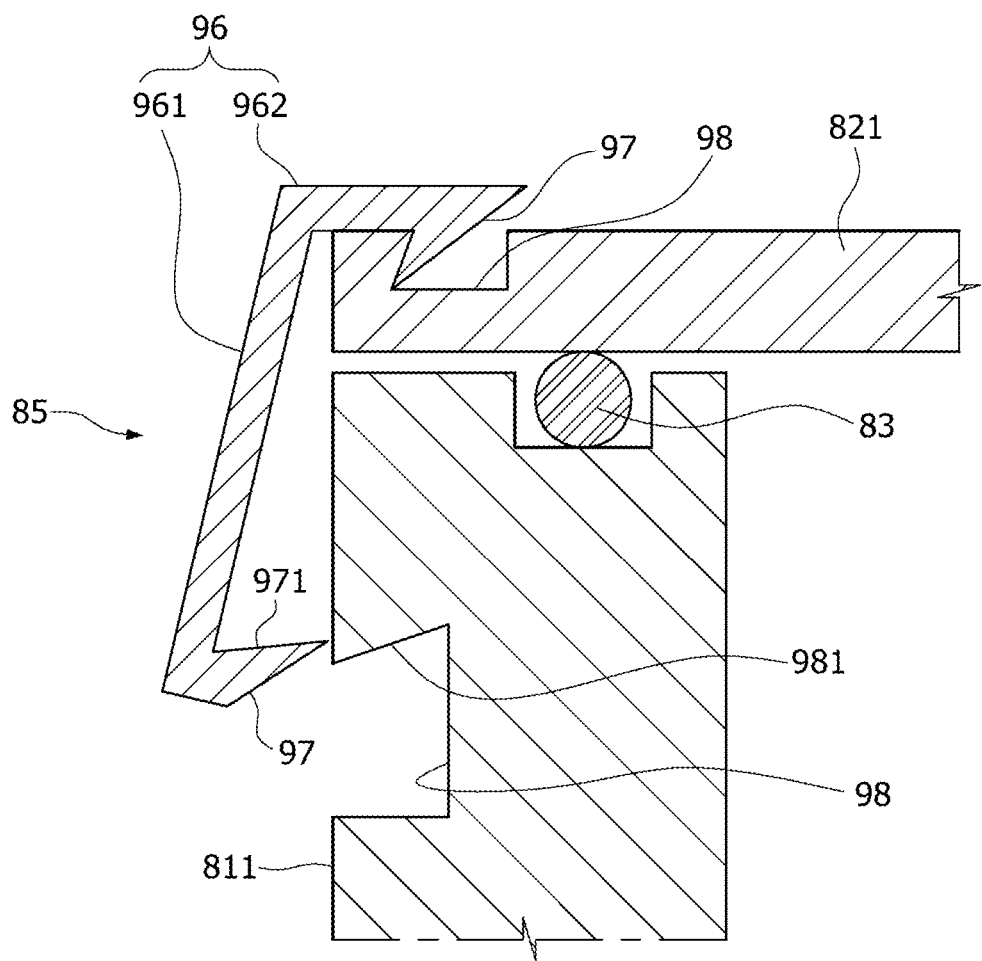
FIG. 7 is a diagram schematically illustrating a state before a hook coupling part in accordance with a second embodiment of the present disclosure is assembled.
Figure 8:
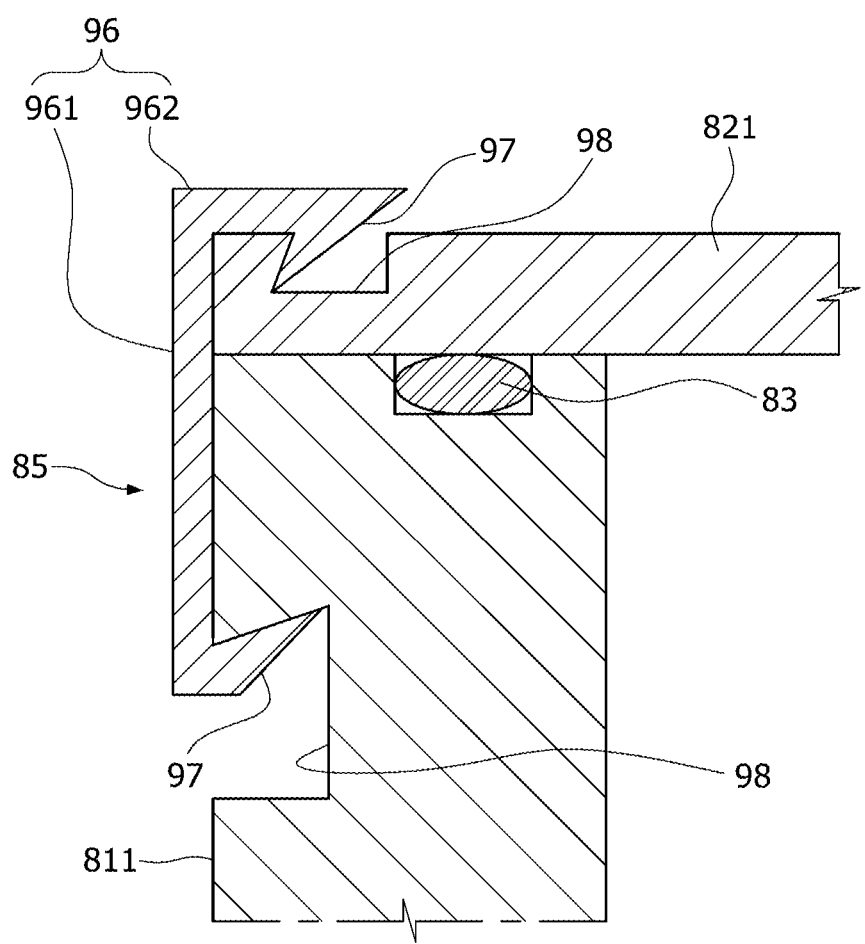
FIG. 8 is a diagram schematically illustrating a state in which the hook coupling part in accordance with the second embodiment of the present disclosure is completely assembled.

FIG. 7 is a diagram schematically illustrating a state before a hook coupling part in accordance with a second embodiment of the present disclosure is assembled, and FIG. 8 is a diagram schematically illustrating a state in which the hook coupling part in accordance with the second embodiment of the present disclosure is completely assembled. Referring to FIGS. 7 and 8, the hook coupling part 85 in accordance with the embodiment of the present disclosure includes a second hook rod part 96, a second hook protrusion part 97 and a second hook locking part 98.

The second hook rod part 96 is disposed outside the first and second housing parts 81 and 82, and has elasticity. For example, the plurality of second hook rod parts 96 may be formed in a bent rod shape, and disposed to cover the outsides of the first and second housing body parts 811 and 821 covering the gear part 20. The second hook rod part 96 may include a first rod part 961 disposed outside the first housing body part 811 and a second rod part 962 disposed outside the second housing body part 821.

The second hook protrusion parts 97 are formed at both ends of the second hook rod part 96, and protrude to the insides of the first and second housing parts 81 and 82, respectively. For example, the end portions of the second hook protrusion parts 97 may have a cross-section formed in a triangle shape, and have vertexes facing the insides of the first and second housing parts 81 and 82, respectively.

The second hook locking parts 98 are formed in the first and second housing parts 81 and 82, and the second hook protrusion parts 97 are inserted and locked to the second hook locking parts 98, respectively. For example, the second hook locking part 98 may be formed in a recessed groove shape outside the first housing body part 811 and the outside of the second housing body part 821. When the second housing body part 821 presses the sealing part 83 after the second hook protrusion part 97 formed at the end of the second rod part 962 is locked and fixed to the second hook locking part 98 formed outside the second housing body part 821, the second hook protrusion part 97 formed at the end of the first rod part 961 may be locked and fixed to the second hook locking part 98 formed outside the first housing body part 811.

At this time, the second hook protrusion part 97 has a second inclined surface 971 formed at an end thereof, and the second hook locking part 98 has a second locking step 981 corresponding to the second inclined surface 971. For example, when the second hook protrusion part 97 has a cross-section formed in an obtuse triangle shape, the second hook protrusion part 97 may be prevented from being released from the hook coupling, after being locked and fixed to the second hook locking part 98.

The assembling process of the electric booster in accordance with the embodiment of the present disclosure, which has the above-described structure, will be described as follows.

In the case of the hook coupling part 85 in accordance with the first embodiment, when the second housing part 82 is seated on the end of the first housing part 81, the first hook extension part 91 is disposed outside the first housing part 81 (see FIG. 5).

In the above-described state, the second housing part 82 is brought into contact with the sealing part 83. At this time, when the second housing part 82 is moved toward the first housing part 81, the first hook protrusion part 92 is locked and fixed to the first hook locking part 93 while the sealing part 83 is deformed (see FIG. 6).

In the case of the hook coupling part 85 in accordance with the second embodiment, the second housing part 82 is seated on the end of the first housing part 81, and then the second hook protrusion part 97 formed on the second rod part 962 is locked and fixed to the second housing part 82 (see FIG. 7).

In the above-described state, when the first and second housing parts 81 and 82 are disposed to face each other, the second housing part 82 is brought into contact with the sealing part 83. At this time, when the second housing part 82 is moved toward the first housing part 81, the second hook protrusion part 97 formed on the first rod part 961 is locked and fixed to the first housing part 81 while the sealing part 83 is deformed (see FIG. 8).

When the first and second housing parts 81 and 82 are hook-coupled by the hook coupling part 85, the first and second housing parts 81 and 82 may be bolt-coupled through the bolt coupling part 84.

In the electric booster 1 in accordance with the embodiment of the present disclosure, the bolt coupling and the hook coupling may be applied according to a portion which requires the support force of the housing part 80, which makes it possible to improve the assembling performance.

In the electric booster 1 in accordance with the embodiment of the present disclosure, the sealing part 83 may be disposed between the first and second housing parts 81 and 82 so as to block introduction of moisture.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electric booster comprising:
    a driving part;
    a gear part configured to be rotated by the driving part so as to transfer power;
    a rotating nut part configured to rotate by the gear part;
    a moving bolt part configured to be screwed to the rotating nut part, and configured to linearly reciprocate by rotation of the rotating nut part;
    a pedal pressing part extending through the moving bolt part, and configured to transfer a pedal force;
    a load part configured to move by the moving bolt part and the pedal pressing part, and configured to amplify hydraulic pressure of a cylinder part, the load part having a groove at one side of the load part away from the cylinder part;
    a disk part disposed in the load part, and configured to relieve shock of the moving bolt part and the pedal pressing part, the disk part having an outer diameter smaller than an inner diameter of the groove of the load part so as to be disposed entirely inside the groove; and
    a housing part disposed on the driving part and configured to house the gear part, the rotating nut part, the moving bolt part and the pedal pressing part, the housing part comprising a pair of housing parts to which any one or more of bolt coupling and hook coupling is applied,
    wherein the housing part comprises:
        a first housing part coupled to the driving part, and having one open side through which the gear part, the rotating nut part, the moving bolt part and the pedal pressing part are housed in the first housing part;
        a second housing part configured to cover the open side of the first housing part; and
        a hook coupling part configured to hook-couple the first and second housing parts to each other,
    wherein the hook coupling part comprises:
        a first hook extension part extended from the second housing part so as to cover the first housing part, and having elasticity;
        a first hook protrusion part formed at an end of the first hook extension part, and protruding to the inside of the first housing part; and
        a first hook locking part formed in the first housing part, such that the first hook protrusion part is inserted and locked to the first hook locking part,
    wherein the first hook protrusion part has a first inclined surface formed thereon, and the first hook locking part has a first locking step corresponding to the first inclined surface.

2. The electric booster of claim 1, wherein the housing part further comprises:
    a sealing part disposed between the first and second housing parts; and
    a bolt coupling part configured to bolt-couple the first and second housing parts to each other.

3. The electric booster of claim 2, wherein the bolt coupling part couples the first and second housing parts which cover the moving bolt part.

4. The electric booster of claim 3, wherein the first housing part comprises:
    a first housing body part having one open side;
    a first housing insertion part formed at an end of the first housing body part, such that the sealing part is inserted into the first housing insertion part; and
    a first housing coupling part protruding to the outside of the first housing body part, and configured to induce coupling with the bolt coupling part.

5. The electric booster of claim 4, wherein the second housing part comprises:

a second housing body part configured to cover the open side of the first housing body part, and press the sealing part; and a second housing coupling part protruding to the outside of the second housing body part, and configured to induce coupling with the bolt coupling part.

6. The electric booster of claim 1, wherein the hook coupling part couples the first and second housing parts which cover the gear part.

7. An electric booster comprising:

a driving part;

a gear part configured to be rotated by the driving part so as to transfer power;

a rotating nut part configured to rotate by the gear part;

a moving bolt part configured to be screwed to the rotating nut part, and configured to linearly reciprocate by rotation of the rotating nut part;

a pedal pressing part extending through the moving bolt part, and configured to transfer a pedal force;

a load part configured to move by the moving bolt part and the pedal pressing part, and configured to amplify hydraulic pressure of a cylinder part, the load part having a groove at one side of the load part away from the cylinder part;

a disk part disposed in the load part, and configured to relieve shock of the moving bolt part and the pedal pressing part, the disk part having an outer diameter smaller than an inner diameter of the groove of the load part so as to be disposed entirely inside the groove; and a housing part disposed on the driving part and configured to house the gear part, the rotating nut part, the moving bolt part and the pedal pressing part, the housing part comprising a pair of housing parts to which any one or more of bolt coupling and hook coupling is applied, wherein the housing part comprises:

a first housing part coupled to the driving part, and having one open side through which the gear part, the rotating nut part, the moving bolt part and the pedal pressing part are housed in the first housing part;

a second housing part configured to cover the open side of the first housing part; and a hook coupling part configured to hook-couple the first and second housing parts to each other, wherein the hook coupling part comprises:

a first hook rod part disposed outside the first and second housing parts, and having elasticity;

a first hook protrusion part formed at either end of the first hook rod part, and protruding to the inside of each of the first and second housing parts; and a first hook locking part formed in each of the first and second housing parts, such that the first hook protrusion part is inserted and locked to the first hook locking part, and wherein the first hook protrusion part has a first inclined surface formed thereon, and the first hook locking part has a first locking step corresponding to the first inclined surface.

* * * * *